United States Patent
Yuen et al.

(10) Patent No.: US 10,267,334 B2
(45) Date of Patent: Apr. 23, 2019

(54) ANNULAR HEATSHIELD

(71) Applicant: United Technologies Corporation, Farmington, CT (US)

(72) Inventors: Yuk-Kwan Brian Yuen, Wethersfield, CT (US); William R. Castle, Vernon, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 341 days.

(21) Appl. No.: 15/225,499

(22) Filed: Aug. 1, 2016

(65) Prior Publication Data
US 2018/0031002 A1 Feb. 1, 2018

(51) Int. Cl.
| F01D 25/16 | (2006.01) |
| F02C 7/047 | (2006.01) |
| F04D 29/58 | (2006.01) |
| F04D 19/00 | (2006.01) |
| F04D 27/00 | (2006.01) |
| F04D 29/02 | (2006.01) |
| F04D 29/056 | (2006.01) |

(Continued)

(52) U.S. Cl.
CPC ......... F04D 29/5853 (2013.01); F01D 25/02 (2013.01); F01D 25/162 (2013.01); F02C 7/047 (2013.01); F04D 19/002 (2013.01); F04D 27/009 (2013.01); F04D 29/023 (2013.01); F04D 29/056 (2013.01); F04D 29/522 (2013.01); F04D 29/584 (2013.01); F05D 2220/36 (2013.01); F05D 2240/15 (2013.01); *F05D 2260/20* (2013.01); *F05D 2300/177* (2013.01); *Y02T 50/675* (2013.01)

(58) Field of Classification Search
CPC ........ F01D 25/10; F01D 25/16; F01D 25/162; F01D 25/02; F01D 9/06; F04D 29/5853; F04D 19/002; F04D 29/522; F04D 29/584; F02C 3/04; F02C 7/047; F05D 2260/231; F05D 2300/177; F05D 2240/35
See application file for complete search history.

(56) References Cited

U.S. PATENT DOCUMENTS

| 2,594,118 A * | 4/1952 | Boyd | F02C 7/047 |
| | | | 244/134 R |
| 2,630,965 A * | 3/1953 | Greatrex | F02C 7/047 |
| | | | 244/134 C |

(Continued)

FOREIGN PATENT DOCUMENTS

| EP | 1801390 A2 | 6/2007 |
| GB | 853723 A | 11/1960 |
| GB | 1012909 A | 12/1965 |

OTHER PUBLICATIONS

Extended European Search Report, dated Dec. 4, 2017, in European Application No. 17182029.3.

*Primary Examiner* — Todd E Manahan
*Assistant Examiner* — Eric W Linderman
(74) *Attorney, Agent, or Firm* — Snell & Wilmer L.L.P.

(57) ABSTRACT

A fan section includes a fan inlet case, fan bearing assembly, and an annular heatshield. The fan bearing assembly may be coupled to the fan inlet case and the annular heatshield may be mounted to the fan inlet case. In various embodiments, the annular heatshield is configured to reduce convective heat transfer from heated fluid to the fan bearing assembly.

20 Claims, 6 Drawing Sheets

(51) Int. Cl.
  *F04D 29/52* (2006.01)
  *F01D 25/02* (2006.01)

(56) References Cited

U.S. PATENT DOCUMENTS

| | | | | |
|---|---|---|---|---|
| 2,680,345 A * | 6/1954 | Frost | B64D 15/02 | 244/134 C |
| 2,712,727 A * | 7/1955 | Morley | F02C 7/047 | 244/134 R |
| 2,756,561 A * | 7/1956 | Morley | F02C 7/06 | 415/122.1 |
| 2,827,760 A * | 3/1958 | Marchant | F01D 9/065 | 60/39.093 |
| 3,116,789 A * | 1/1964 | Kent | F02C 7/047 | 165/142 |
| 3,262,636 A * | 7/1966 | Palfreyman | F02C 7/047 | 415/115 |
| 3,341,114 A * | 9/1967 | Larson | F02C 7/047 | 244/134 R |
| 3,844,110 A * | 10/1974 | Widlansky | F02C 7/06 | 60/39.08 |
| 3,925,979 A * | 12/1975 | Ziegler | F02C 7/047 | 244/134 R |
| 3,981,466 A * | 9/1976 | Shah | B64D 15/02 | 244/134 R |
| 4,645,415 A * | 2/1987 | Hovan | F01D 25/125 | 415/115 |
| 4,688,745 A * | 8/1987 | Rosenthal | B64D 15/04 | 244/134 R |
| 4,782,658 A * | 11/1988 | Perry | F02C 7/047 | 60/226.1 |
| 4,831,819 A * | 5/1989 | Norris | B64D 15/22 | 244/134 R |
| 4,852,343 A * | 8/1989 | Norris | B64D 15/22 | 60/779 |
| 4,863,354 A * | 9/1989 | Asselin | B64C 11/14 | 416/245 R |
| 4,979,872 A * | 12/1990 | Myers | F01D 9/065 | 403/131 |
| 4,993,918 A * | 2/1991 | Myers | F01D 9/065 | 415/191 |
| 4,999,994 A * | 3/1991 | Rud | F02C 7/047 | 416/170 R |
| 5,029,440 A * | 7/1991 | Graber | F02C 7/047 | 244/134 B |
| 5,088,277 A * | 2/1992 | Schulze | B64D 15/04 | 244/134 R |
| 5,107,676 A * | 4/1992 | Hadaway | F01D 25/18 | 184/6.11 |
| 5,110,257 A * | 5/1992 | Hibner | F01D 25/164 | 415/119 |
| 5,114,100 A * | 5/1992 | Rudolph | B64C 21/06 | 244/130 |
| 5,281,091 A * | 1/1994 | Dooley | F02C 7/047 | 244/134 D |
| 5,317,877 A * | 6/1994 | Stuart | F02C 7/185 | 60/736 |
| 5,351,478 A * | 10/1994 | Walker | F01D 25/26 | 415/144 |
| 5,623,821 A * | 4/1997 | Bouiller | B64D 33/02 | 219/679 |
| 5,638,675 A * | 6/1997 | Zysman | F02K 1/386 | 181/220 |
| 6,079,670 A * | 6/2000 | Porte | B64D 15/04 | 165/170 |
| 6,131,855 A * | 10/2000 | Porte | B64D 15/04 | 244/134 B |
| 6,193,192 B1 * | 2/2001 | Porte | F02C 7/047 | 244/134 B |
| 6,223,616 B1 * | 5/2001 | Sheridan | F16H 1/2827 | 184/6.12 |
| 6,241,189 B1 * | 6/2001 | Porte | B64D 15/04 | 244/134 B |
| 6,325,546 B1 * | 12/2001 | Storace | F01D 21/04 | 384/536 |
| 6,371,411 B1 * | 4/2002 | Breer | F02C 7/047 | 244/134 B |
| 6,442,944 B1 * | 9/2002 | Skur, III | B64D 13/00 | 244/134 R |
| 8,322,038 B1 * | 12/2012 | Heidari | F02C 7/06 | 29/898 |
| 8,829,702 B1 * | 9/2014 | Menheere | F02C 7/275 | 290/47 |
| 2005/0022501 A1 * | 2/2005 | Eleftheriou | F01D 5/22 | 60/226.1 |
| 2007/0140860 A1 * | 6/2007 | Mitchell | F01D 5/00 | 416/229 A |
| 2008/0298955 A1 * | 12/2008 | Major | F01D 11/001 | 415/164 |
| 2010/0236215 A1 * | 9/2010 | Venkataramani | F01D 9/065 | D9/65 |
| 2011/0131999 A1 * | 6/2011 | Gao | B64D 13/06 | 60/782 |
| 2012/0251306 A1 * | 10/2012 | Reinhardt | F01D 25/28 | 415/182.1 |
| 2012/0277055 A1 * | 11/2012 | Sheridan | F01D 25/16 | 475/331 |
| 2013/0078080 A1 * | 3/2013 | Durocher | F01D 25/125 | 415/110 |
| 2013/0177385 A1 * | 7/2013 | Munsell | F01D 25/16 | 415/1 |
| 2013/0192248 A1 * | 8/2013 | Ackermann | F02C 7/047 | 60/779 |
| 2013/0219917 A1 * | 8/2013 | Suciu | F01D 5/081 | 60/782 |
| 2013/0219919 A1 * | 8/2013 | Suciu | F01D 5/081 | 60/782 |
| 2013/0312861 A1 * | 11/2013 | Brill | F23R 3/02 | 138/109 |
| 2014/0030088 A1 * | 1/2014 | Coffin | F01D 25/16 | 415/229 |
| 2016/0061056 A1 * | 3/2016 | Appukuttan | F01D 25/10 | 415/144 |
| 2016/0102577 A1 | 4/2016 | Grant et al. | | |
| 2016/0341123 A1 * | 11/2016 | Socha | F01D 9/065 | |
| 2017/0089220 A1 * | 3/2017 | Carter | F16C 27/045 | |
| 2017/0314465 A1 * | 11/2017 | Beutin | F02K 3/025 | |
| 2017/0362959 A1 * | 12/2017 | Suciu | F01D 25/20 | |
| 2018/0216482 A1 * | 8/2018 | Munsell | F01D 15/12 | |
| 2018/0216483 A1 * | 8/2018 | Munsell | F01D 15/12 | |

* cited by examiner

ANNULAR HEATSHIELD

FIELD

The present disclosure relates to gas turbine engines, and more specifically, heat transfer in a fan section of gas turbine engines.

BACKGROUND

A gas turbine engine typically includes a fan section, a compressor section, a combustor section, and a turbine section. A fan section may drive air along a bypass flowpath while a compressor section may drive air along a core flowpath. In general, during operation, air is pressurized in the compressor section and is mixed with fuel and burned in the combustor section to generate hot combustion gases. The hot combustion gases flow through the turbine section, which extracts energy from the hot combustion gases to power the compressor section and other gas turbine engine loads. The compressor section typically includes low pressure and high pressure compressors, and the turbine section includes low pressure and high pressure turbines.

A fan section may be heated to prevent or mitigate ice build-up in the fan section, especially in cold environments. Heated fluid, such as heated air from the compressor section, may be diverted from the compressor section to the fan section to heat the fan section. However, heat transferred from the heated fluid to the bearing assembly may cause concerns relating to the coking of lubricants to arise and/or may otherwise damage the bearing assembly.

SUMMARY

In various embodiments, a fan section is disclosed herein. The fan section, according to various embodiments, includes a fan inlet case, fan bearing assembly, and an annular heatshield. The fan bearing assembly may be coupled to the fan inlet case and the annular heatshield may be mounted to the fan inlet case. In various embodiments, the annular heatshield is configured to reduce convective heat transfer from heated fluid to the fan bearing assembly.

In various embodiments, the fan bearing assembly includes a bearing and a bearing support engaged about the bearing. The annular heatshield may be configured to reduce convective heat transfer from the heated fluid to the bearing support. The annular heatshield may be substantially parallel with a central rotational axis of the fan and the annular heatshield may be radially outward relative to and spaced a radial distance apart from a radially outward surface of the bearing support that is parallel to the central rotational axis of the fan. In various embodiments, an aft edge of the annular heatshield may contour features of at least one of the bearing support and the fan inlet case.

In various embodiments, the annular heatshield is made from a nickel alloy material. In various embodiments, the annular heatshield may be made from a material configured to withstand temperatures up to and above a coking temperature of an oil configured for use in the fan bearing assembly. The annular heatshield and a radially inward surface of the fan inlet case may form a plenum chamber for the heated fluid. The plenum chamber may extend circumferentially around the fan bearing assembly. According to various embodiments, the annular heatshield may have a flange at a forward edge of the annular heatshield for mounting the annular heatshield to the fan inlet case. The fan inlet case may include fluid passages through which the heated fluid is configured to flow.

Also disclosed herein, according to various embodiments, is a gas turbine engine. The gas turbine engine includes, in accordance with various embodiments, a compressor section and a fan section upstream of the compressor section. The fan section may include a fan inlet case having fluid passages configured to fluidly receive heated fluid from the compressor section. The fan section may also include a fan bearing assembly coupled to the fan inlet case and an annular heatshield mounted to the fan inlet case. The annular heatshield may be configured to reduce convective heat transfer from the heated fluid to the fan bearing assembly.

In various embodiments, the fan bearing assembly is a forward fan bearing assembly. The fan inlet case may include radially extending struts and the fluid passages extend through the struts. According to various embodiments, the fan section may have a low-bypass ratio. For example, the fan section may have a bypass ratio of less than about two (2). In various embodiments, the fan section may have a bypass ratio of less than about one (1).

Also disclosed herein, according to various embodiments, is a method of heating a fan section of a gas turbine engine. The method includes diverting heated fluid from at least one of a compressor section and a combustor section to a fan inlet case of the fan section, flowing the heated fluid through fluid passages of the fan inlet case, and flowing the heated fluid through a plenum chamber formed by a radially inward surface of the fan inlet case and an annular heatshield mounted to the fan inlet case.

In various embodiments, the annular heatshield may be substantially parallel with an engine central longitudinal axis and the annular heatshield may be radially outward relative to and spaced a radial distance apart from a radially outward surface of a bearing support that is parallel to the engine central longitudinal axis. In various embodiments, flowing the heated fluid through the plenum chamber includes substantially isolating the heated fluid from the radially outward surface of the bearing support.

According to various embodiments, flowing the heated fluid through the fluid passages may include flowing the heated fluid radially inward towards the plenum chamber and radially outward from the plenum chamber. In various embodiments, flowing the heated fluid through the plenum chamber may include flowing the heated fluid circumferentially.

The forgoing features and elements may be combined in various combinations without exclusivity, unless expressly indicated herein otherwise. These features and elements as well as the operation of the disclosed embodiments will become more apparent in light of the following description and accompanying drawings.

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration. While these exemplary embodiments are described in sufficient detail to enable those skilled in the art to practice the disclosure, it should be understood that other embodiments may be realized and that logical changes and adaptations in design and construction may be made in accordance with this disclosure and the teachings herein without departing from the spirit and scope of the disclosure. Thus, the detailed description herein is presented for purposes of illustration only and not of limitation.

In various embodiments, a gas turbine engine is provided. Gas turbine engine may be a two-spool turbofan that generally incorporates a fan section 22, a compressor section a combustor section and a turbine section. Alternative engines may include, for example, an augmentor section among other systems or features. In operation, fan section 22 can drive working fluid (e.g., air) along a bypass flow-path while compressor section can drive working fluid along a core flow-path for compression and communication into combustor section then expansion through turbine section. It should be understood that the concepts described herein are not limited to use with turbofans as the teachings may be applied to other types of turbine engines including three-spool architectures.

Gas turbine engine may generally comprise a low speed spool and a high speed spool mounted for rotation about an engine central longitudinal axis relative to an engine static structure or engine case via several bearing systems. It should be understood that various bearing systems at various locations may alternatively or additionally be provided. In various embodiments, for example a forward bearing system and/or a fan inlet case may be forward relative to the fan blades.

Low speed spool may generally comprise an inner shaft that interconnects a fan, a low pressure compressor and a low pressure turbine. Inner shaft may be connected to fan through a geared architecture that can drive fan at a lower speed than low speed spool. Geared architecture may comprise a gear assembly enclosed within a gear housing. Gear assembly couples inner shaft to a rotating fan structure. High speed spool may comprise an outer shaft that interconnects a high pressure compressor and high pressure turbine. A combustor may be located between high pressure compressor and high pressure turbine. A mid-turbine frame of engine static structure may be located generally between high pressure turbine and low pressure turbine. Mid-turbine frame may support one or more bearing systems in turbine section. Inner shaft and outer shaft may be concentric and rotate via bearing systems about the engine central longitudinal axis, which is collinear with their longitudinal axes. As used herein, a "high pressure" compressor or turbine experiences a higher pressure than a corresponding "low pressure" compressor or turbine.

The core airflow may be compressed by low pressure compressor then high pressure compressor, mixed and burned with fuel in combustor, then expanded over high pressure turbine and low pressure turbine. Turbines rotationally drive the respective low speed spool and high speed spool in response to the expansion. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion.

Gas turbine engine may be, for example, a low-bypass ratio geared aircraft engine. In various embodiments, the bypass ratio of gas turbine engine may be less than two (2). In various embodiments, the bypass ratio of gas turbine engine may be less than one (1). In various embodiments, geared architecture may be an epicyclic gear train, such as a star gear system (sun gear in meshing engagement with a plurality of star gears supported by a carrier and in meshing engagement with a ring gear) or other gear system. Geared architecture may have a gear reduction ratio of greater than about 2.3 and low pressure turbine may have a pressure ratio that is greater than about five (5). In various embodiments, the diameter of fan may be significantly larger than that of the low pressure compressor, and the low pressure turbine may have a pressure ratio that is greater than about five (5:1). Low pressure turbine pressure ratio may be measured prior to inlet of low pressure turbine as related to the pressure at the outlet of low pressure turbine prior to an exhaust nozzle. It should be understood, however, that the above parameters are exemplary of various embodiments of a suitable geared architecture engine and that the present disclosure contemplates other gas turbine engines including direct drive turbofans. A gas turbine engine may comprise an industrial gas turbine (IGT) or a geared aircraft engine, such as a geared turbofan, or non-geared aircraft engine, such as a turbofan, or may comprise any gas turbine engine as desired.

In various embodiments, and with reference to FIG. 1-5, an annular heatshield 130 is disclosed. As described above, the gas turbine engine generally includes various sections, including a fan section 22. In various embodiments, the gas turbine engine may have a low-bypass ratio. For example, in various embodiments the bypass ratio may be less than about two (2). In various embodiments, the bypass ratio may be less than one (1).

In various embodiments, the fan section 22 may include a fan inlet case 110 and a fan bearing assembly 120. As mentioned above, in order to mitigate ice build-up, a heated fluid, such as heated air from the compressor section of the gas turbine and/or heated combustion gases from the combustor section, may be diverted to flow through the fan inlet case 110 of the fan section 22. For example, fluid passages extending through the fan inlet case 110 of the fan section 22 may distribute the heated fluid through-out portions of the fan section 22 in order to heat various components of the fan section 22 pre-flight and/or during flight, especially in environments capable of creating icing conditions. However, because the fan bearing assembly 120 may be susceptible to concerns relating to the coking of lubricants and/or may be otherwise damaged if exposed to extensive or excessive heating from the heated fluid, the annular heatshield 130 is provided, according to various embodiments, to reduce convective heat transfer from heated fluid to the fan bearing assembly 120.

In various embodiments, the fan inlet case 110 may include one or more struts 112 that extend radially between an outer fan casing 111 and a radially inward surface 114 of the fan inlet case 110. Fluid passages may receive diverted heated fluid from, for example, the compressor section, and may extend through the outer casing 111 and the one or more struts 112 the fan inlet case 110.

In various embodiments, the fan bearing assembly 120 may be a forward fan bearing assembly. In various embodiments, and with reference to FIGS. 1 and 2, the fan bearing assembly 120 may include a bearing 121 and a bearing support 122. Without the annular heatshield 130, the bearing support 122 may be susceptible to concerns relating to the coking of lubricants and may be otherwise damaged if and/or when exposed to the temperatures of the heated fluid. Further, such damage to the bearing support 122 would be potentially exacerbated due to the lack of oil flow to the bearing support 122, in various embodiments. That is, the bearing support 122 may not be in contact with oil, or may not have sufficient oil exposure, and thus may not experience the cooling effect of oil circulation.

Figure 1:
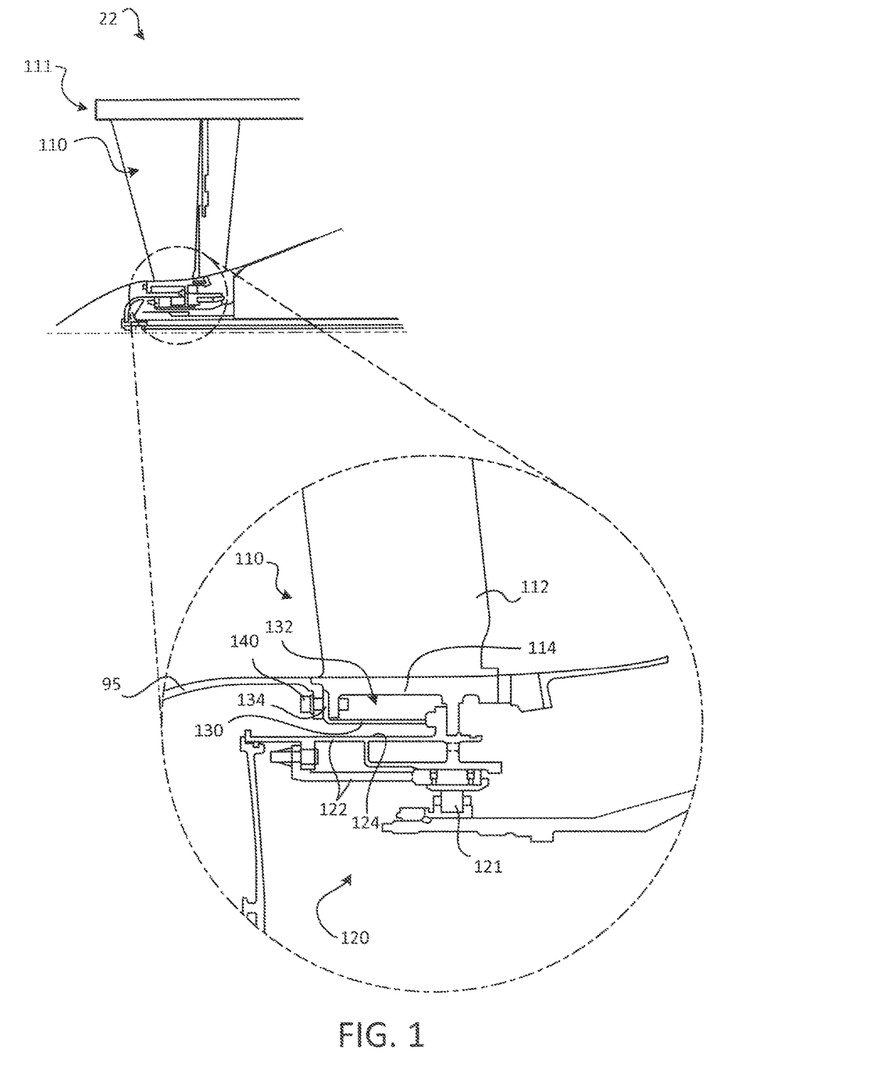
FIG. 1 illustrates a cross-sectional view, including a magnified view, of an annular heatshield mounted to a fan inlet case of a gas turbine engine, in accordance with various embodiments.
Figure 2:
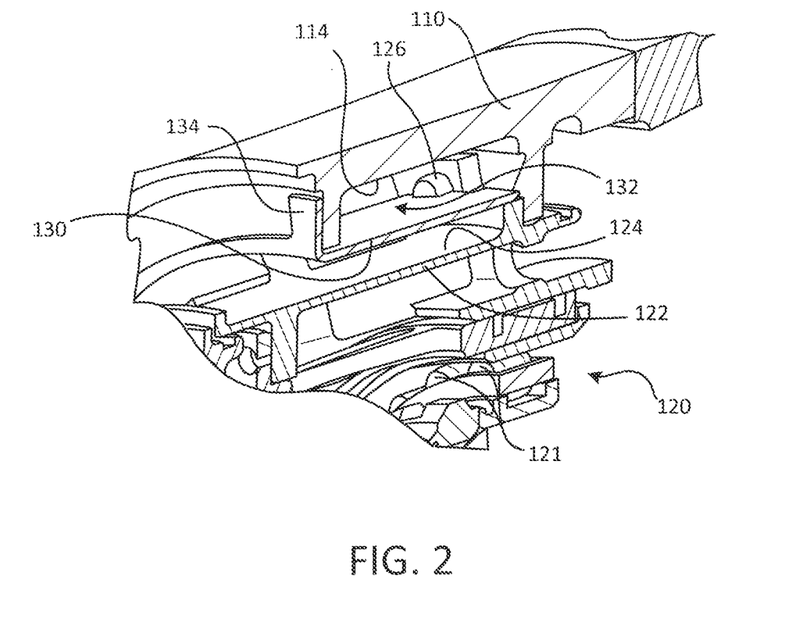
FIG. 2 illustrates a perspective cross-sectional view of an annular heatshield mounted to a fan inlet case of a gas turbine, in accordance with various embodiments.

The annular heatshield 130, according to various embodiments, may be disposed substantially between the bearing support 122 and the fan inlet case 110 to prevent or at least mitigate the convective transfer of heat from the heated fluid flowing through the fluid passages in the fan inlet case 110 to the bearing support 122. Said differently, and according to various embodiments, the annular heatshield 130 may be disposed radially inward from the radially inward surface 114 of the fan inlet case 110 and radially outward from a radially outward surface 124 of the bearing support 122. In various embodiments, the annular heatshield 130 may be positioned a radial distance away from and the radially outward surface 124 of the bearing support 122, thereby forming an air gap between the annular heatshield 130 and the bearing support 122 to thermally insulate the bearing support 122 from the heated fluid.

In various embodiments, the annular heatshield 130 may extend in a direction that is parallel to the engine central longitudinal axis (i.e., the central rotational axis of the fan section 22). In various embodiments, the radially inward surface 114 of the fan inlet case 110 and the radially outward surface 124 of the bearing support 122 may be parallel to the engine central longitudinal axis.

In various embodiments, the annular heatshield 130 may include multiple arcuate sections that collectively form the ring-like structure of the annular heatshield 130. In various embodiments, the annular heatshield 130 may be made from a nickel based alloy and/or a cobalt based alloy, among others. For example, the annular heatshield 130 may be made from a high performance nickel-based super alloy (e.g., an alloy that comprises, by wt %, 58% nickel, 19% chromium, 13% cobalt, 4% molybdenum, 3% titanium and 1.4% aluminum that is available under the trade name Waspaloy™, available from Special Metals Corporation of New Hartford, N.Y., USA). In various embodiments, the annular heatshield 130 may be made from a cobalt-nickel-chromium-tungsten alloy. In various embodiments, the annular headshield 130 may be made from other metals or metal alloys, such as stainless steel, etc. In various embodiments, the material of the annular heatshield 130 may be resistant to corrosion and may include one or more surface coatings. The annular heatshield 130 may be able to withstand the temperature of the heated fluid, which may reach temperatures of about 1,200 degrees Fahrenheit (about 650 degrees Celsius), in accordance with various embodiments. In various embodiments, the heated fluid adjacent the annular heatshield 130 may be at or above oil coking temperatures, such as about 500 degrees Fahrenheit (about 260 degrees Celsius). Accordingly, without the heatshield 130, the operation of the fan bearing assembly 120 would potentially be compromised due to the coking of oil and/or other lubricants. As used in this context, according to various embodiments, the term "about" is defined as plus or minus 100 degrees Fahrenheit (about 55 degrees Celsius).

In addition to preventing, or at least restricting, convective heat transfer from the heated fluid to the bearing support 122, the annular heatshield 130 may also form, together with the radially inward surface 114 of the fan inlet case, a plenum chamber 132. Said differently, the annular heatshield 130 may be positioned a radial distance away from the radially inward surface 114 of the fan inlet case 110, thereby forming an annular channel that is the plenum chamber 132. The plenum chamber 132, according to various embodiments, may extend circumferentially around the bearing support 122 and may facilitate circumferential distribution of the heated fluid to components and/or areas of the fan section 22. In various embodiments, the plenum chamber 132 may also facilitate a return flow of the heated fluid back through the fluid passages in the one or more struts 112. That is, the heated fluid may exit from the radially inward surface 114 of the fan inlet case 110, may flow through the plenum chamber 132, and may flow back into the one or more struts 112, via the same fluid passage or via a separate, return passage.

Figure 3:
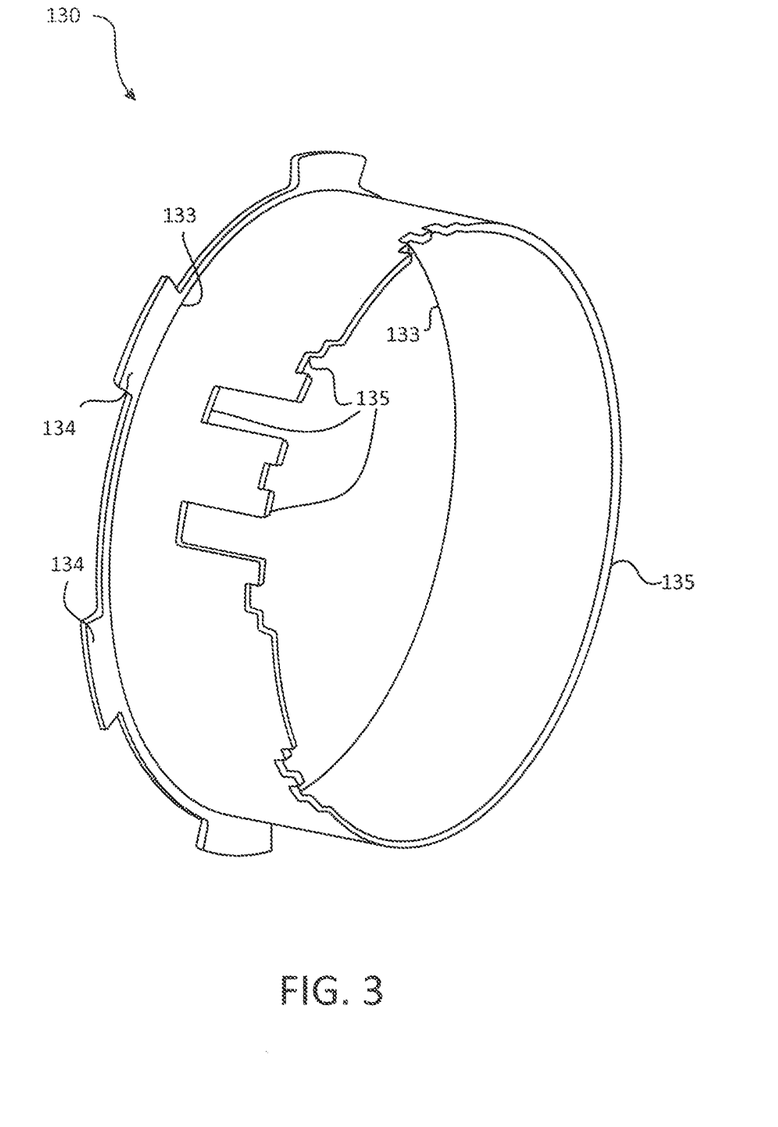
FIG. 3 illustrates a perspective view of an annular heatshield, in accordance with various embodiments.
Figure 4:
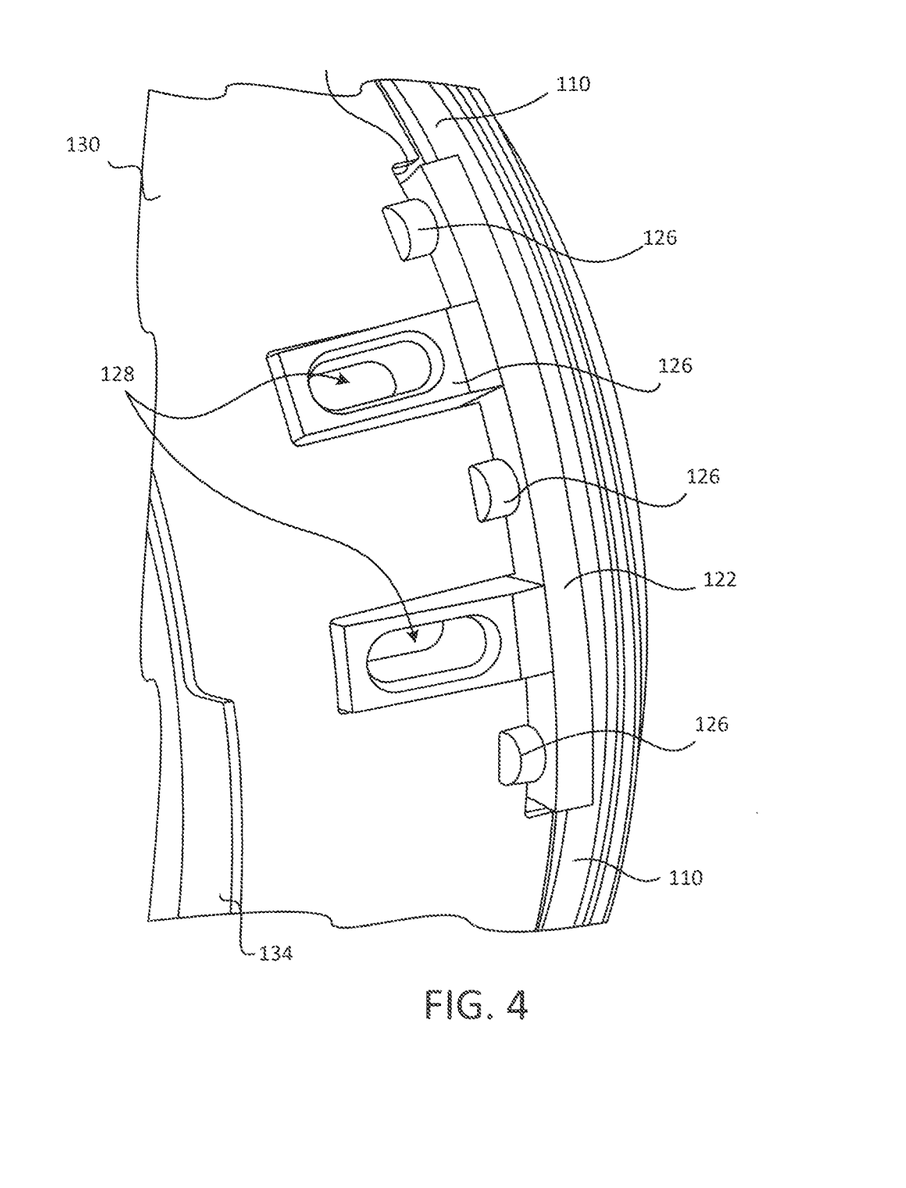
FIG. 4 illustrates a partial perspective view of an annular heatshield contouring a bearing support of a bearing assembly, in accordance with various embodiments.
Figure 5:
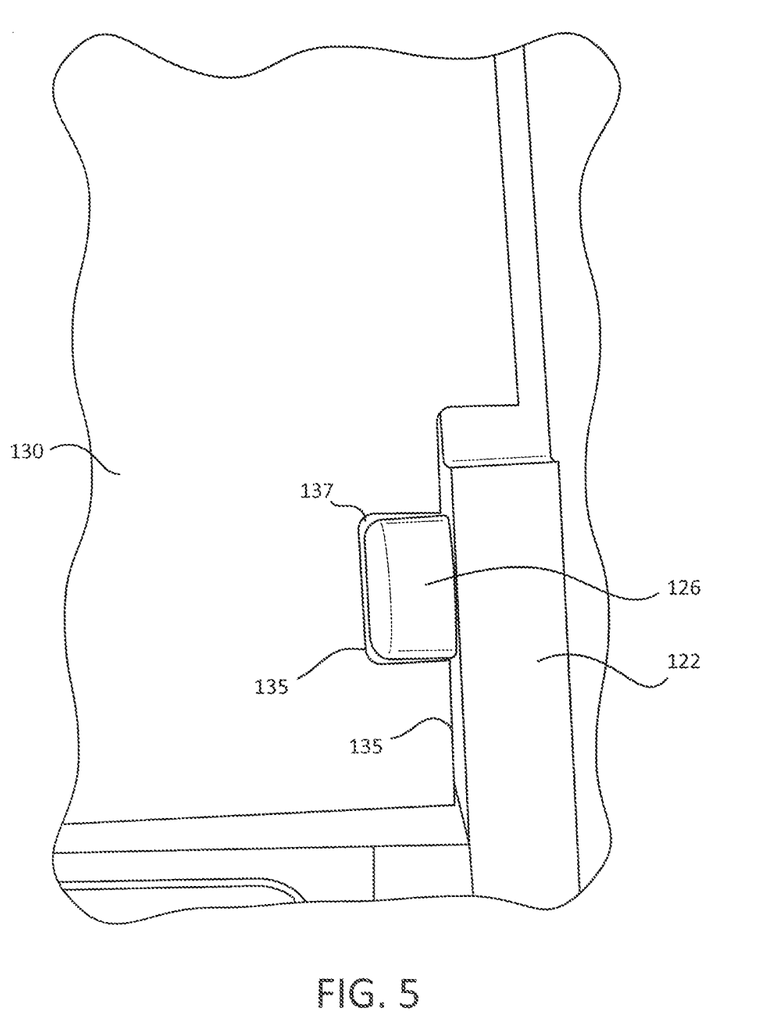
FIG. 5 illustrates a partial perspective view of an annular heatshield contouring a bearing support of a bearing assembly, in accordance with various embodiments.

In various embodiments, and with reference to FIG. 3-5, the annular heatshield 130 may include a flange 134 extending from a forward edge 133 of the annular heatshield 130. The flange 134 may be utilized to mount the annular heatshield 130 to the fan inlet case 110. The flange may extend completely around the forward edge 133 or the flange 134 may be segmented. In various embodiments, a bolt 140 or other fastener may extend through the flange 134 to affix the flange 134 to the fan inlet case 110.

In various embodiments, the annular heatshield 130 may have an aft edge 135 that is shaped to complement and/or contour features 126 protruding from the bearing support 122 and/or the fan inlet case 110. That is, the bearing support 122 may not have a smooth surface and instead may have various fasteners, elements, or components that protrude from the bearing support 122. For example, in various embodiments the bearing support 122 may include pass-through apertures 128 that allow for certain components or conduits, such as electrical or oil conduits, to extend through the bearing support 122 to, for example, the bearings 121. Accordingly, the annular heatshield 130 may be machined to complement the protruding features 126, thus facilitating substantial fluid isolation of the plenum chamber 132 from the radially outward surface 124 of the bearing support 122. In various embodiments, gaps 137 may be present between the aft edge 135 of the annular heatshield 130 and the bearing support 122 and/or the protruding features 126.

Figure 6:
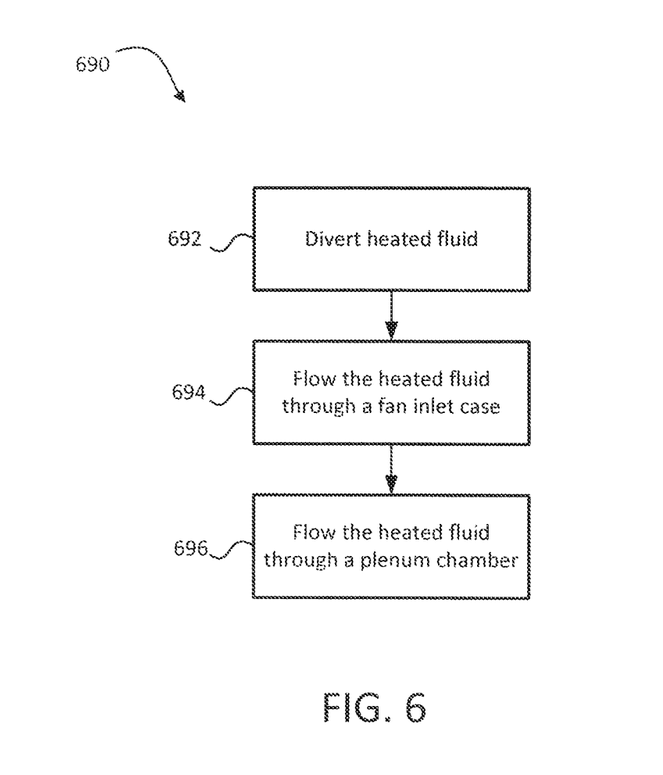
FIG. 6 is a schematic flowchart diagram of a method of heating a fan section of a gas turbine engine, in accordance with various embodiments.

FIG. 6 is a schematic flowchart diagram of a method 690 of heating the fan section 22 of the gas turbine engine, according to various embodiments. The method 690 may include diverting the heated fluid from at least one of the compressor section and the combustor section to the fan inlet case 110 of the fan section 22 at step 692. In various embodiments, the method 690 may include flowing the heated fluid through the fluid passages of the fan inlet case 110 at step 694 and flowing the heated fluid through the plenum chamber 132 formed by the radially inward surface 114 of the fan inlet case 110 and the annular heatshield 130 mounted to the fan inlet case 110 at step 696.

In various embodiments, step 696 may include substantially isolating the heated fluid from the radially outward surface 124 of the bearing support 122. In various embodiments, step 694 may include flowing the heated fluid radially inward towards the plenum chamber 132 and radially outward from the plenum chamber 132. In various embodiments, step 696 may include flowing the heated fluid circumferentially.

As used herein, "aft" refers to the direction associated with the exhaust (e.g., the back end) of a gas turbine engine. As used herein, "forward" refers to the direction associated with the intake (e.g., the front end) of a gas turbine engine.

A first component that is "axially outward" of a second component means that a first component is positioned at a greater distance in the aft or forward direction away from the longitudinal center of the gas turbine along the longitudinal axis of the gas turbine, than the second component. A first component that is "axially inward" of a second component means that the first component is positioned closer to the longitudinal center of the gas turbine along the longitudinal axis of the gas turbine, than the second component.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis. For example, a first component of a combustor that is radially inward or radially outward of a second component of a combustor is positioned relative to the central longitudinal axis of the combustor.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure.

The scope of the disclosure is accordingly to be limited by nothing other than the appended claims, in which reference to an element in the singular is not intended to mean "one and only one" unless explicitly so stated, but rather "one or more." It is to be understood that unless specifically stated otherwise, references to "a," "an," and/or "the" may include one or more than one and that reference to an item in the singular may also include the item in the plural. All ranges and ratio limits disclosed herein may be combined.

Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

The steps recited in any of the method or process descriptions may be executed in any order and are not necessarily limited to the order presented. Furthermore, any reference to singular includes plural embodiments, and any reference to more than one component or step may include a singular embodiment or step. Elements and steps in the figures are illustrated for simplicity and clarity and have not necessarily been rendered according to any particular sequence. For example, steps that may be performed concurrently or in different order are illustrated in the figures to help to improve understanding of embodiments of the present disclosure.

Any reference to attached, fixed, connected or the like may include permanent, removable, temporary, partial, full and/or any other possible attachment option. Additionally, any reference to without contact (or similar phrases) may also include reduced contact or minimal contact. Surface shading lines may be used throughout the figures to denote different parts or areas but not necessarily to denote the same or different materials. In some cases, reference coordinates may be specific to each figure.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A fan section comprising:
   a fan inlet case comprising a radially inward surface;
   a fan bearing assembly coupled to the fan inlet case, the fan bearing assembly comprising a bearing and a bearing support engaged about the bearing, wherein the bearing support comprises a radially outward surface; and
   an annular heatshield mounted to the fan inlet case, wherein the annular heatshield is configured to reduce convective heat transfer from heated fluid to the fan bearing assembly, wherein the annular heatshield comprises a flange, wherein the annular heatshield is parallel with a central rotation axis of the fan and the flange extends from a forward edge of the annular heatshield for mounting the annular heatshield to the fan inlet case;

wherein the annular heatshield is disposed between, substantially parallel with, and radially spaced apart from the radially inward surface of the fan inlet case and the radially outward surface of the bearing support.

2. The fan section of claim 1, wherein the annular heatshield is configured to reduce convective heat transfer from the heated fluid to the bearing support.

3. The fan section of claim 2, wherein the radially inward surface of the fan inlet case, the radially outward surface of the bearing support, and the annular heatshield are cylindrical.

4. The fan section of claim 2, wherein an aft edge of the annular heatshield contours features of at least one of the bearing support and the fan inlet case, wherein a gap is defined between the aft edge of the annular heatshield and the at least one of the bearing support and the fan inlet case.

5. The fan section of claim 1, wherein the annular heatshield extends between the flange at the forward edge and an aft edge.

6. The fan section of claim 1, wherein the annular heatshield comprises a material configured to withstand temperatures up to and above a coking temperature of an oil configured for use in the fan bearing assembly.

7. The fan section of claim 1, wherein the annular heatshield and the radially inward surface of the fan inlet case form a plenum chamber for the heated fluid.

8. The fan section of claim 7, wherein the plenum chamber extends circumferentially around the fan bearing assembly.

9. The fan section of claim 1, wherein the fan inlet case comprises fluid passages through which the heated fluid is configured to flow.

10. A gas turbine engine having an engine central longitudinal axis, the gas turbine engine comprising:
    a compressor section;
    a fan section upstream of the compressor section, the fan section comprising:
        a fan inlet case comprising fluid passages configured to fluidly receive heated fluid from the compressor section, the fan inlet case comprising a radially inward surface that is parallel to the engine central longitudinal axis;
        a fan bearing assembly coupled to the fan inlet case, the fan bearing assembly comprising a bearing and a bearing support engaged about the bearing, wherein the bearing support comprises a radially outward surface that is parallel to the engine central longitudinal axis; and
        an annular heatshield mounted to the fan inlet case, wherein the annular heatshield is configured to reduce convective heat transfer from the heated fluid to the fan bearing assembly, wherein the annular heatshield comprises a flange, wherein the flange extends from a forward edge of the annular heatshield for mounting the annular heatshield to the fan inlet case;
        wherein the annular heatshield is disposed between, substantially parallel with, and radially spaced apart from the radially inward surface of the fan inlet case and the radially outward surface of the bearing support.

11. The gas turbine engine of claim 10, wherein the fan bearing assembly is a forward fan bearing assembly.

12. The gas turbine engine of claim 10, wherein the fan inlet case comprises radially extending struts and the fluid passages extend through the struts.

13. The gas turbine engine of claim 10, wherein the fan section may comprise a low-bypass ratio.

14. The gas turbine engine of claim 10, wherein the fan section may comprise a bypass ratio of less than about two (2).

15. The gas turbine engine of claim 10, wherein the fan section may comprise a bypass ratio of less than about one (1).

16. A method of heating a fan section of a gas turbine engine, the method comprising:
    diverting heated fluid from at least one of a compressor section and a combustor section to a fan inlet case of the fan section;
    flowing the heated fluid through fluid passages of the fan inlet case; and
    flowing the heated fluid through a plenum chamber formed by a cylindrical radially inward surface of the fan inlet case and an annular heatshield mounted to the fan inlet case, wherein the annular heatshield is disposed between, substantially parallel with, and radially spaced apart from the cylindrical radially inward surface of the fan inlet case and a cylindrical radially outward surface of a bearing support.

17. The method of claim 16, wherein:
    the annular heatshield is substantially parallel with an engine central longitudinal axis; and
    flowing the heated fluid through the plenum chamber comprises substantially isolating the heated fluid from the radially outward surface of the bearing support.

18. The method of claim 16, wherein flowing the heated fluid through the fluid passages comprises flowing the heated fluid radially inward towards the plenum chamber and radially outward from the plenum chamber.

19. The method of claim 16, wherein flowing the heated fluid through the plenum chamber comprises flowing the heated fluid circumferentially.

20. The gas turbine engine of claim 10, wherein the radially inward surface of the fan inlet case, the radially outward surface of the bearing support, and the annular heatshield are cylindrical.

* * * * *